(12) United States Patent
Cermak et al.

(10) Patent No.: US 6,379,255 B1
(45) Date of Patent: Apr. 30, 2002

(54) DRIVE ASSEMBLY HAVING A PROPELLER AND AN INTERMEDIATE BEARING

(75) Inventors: Herbert Cermak, Bessenbach; Dietmar Luck, Rodgau, both of (DE)

(73) Assignee: GKN Lobro GmbH (DE)

( * ) Notice: Subject to any disclaimer, the term of this patent is extended or adjusted under 35 U.S.C. 154(b) by 0 days.

(21) Appl. No.: 09/661,871

(22) Filed: Sep. 14, 2000

(30) Foreign Application Priority Data

Sep. 14, 1999 (DE) .......................................... 199 43 880

(51) Int. Cl.$^7$ ................................................. F16C 1/26
(52) U.S. Cl. ........................ 464/179; 464/183; 464/162
(58) Field of Search ................................ 464/178, 179, 464/183, 162, 146, 906

(56) References Cited

U.S. PATENT DOCUMENTS

| | | | |
|---|---|---|---|
| 5,469,931 A | * 11/1995 | Kawata et al. | 464/183 |
| 5,582,546 A | 12/1996 | Welschof | |
| 6,113,499 A | * 9/2000 | Braun et al. | 464/183 |
| 6,171,196 B1 | * 1/2001 | Welschof | 464/146 |

FOREIGN PATENT DOCUMENTS

| | | |
|---|---|---|
| DE | 38 22 644 C2 | 8/1991 |
| DE | 4224201 A1 * | 1/1994 |
| DE | 42 27 967 A1 | 3/1994 |
| DE | 43 43 470 C1 | 2/1995 |
| DE | 43 44 177 C1 | 2/1995 |
| DE | 44 43 070 A1 | 6/1996 |
| DE | 196 52 100 C1 | 4/1998 |
| EP | 0 601 763 A1 | 6/1994 |
| GB | 2 339 461 A | 1/2000 |
| JP | 5215120 * | 8/1993 |
| JP | 10250390 * | 9/1998 |
| JP | 11257337 * | 9/1999 |
| JP | 2000-71792 * | 7/2000 |

* cited by examiner

Primary Examiner—Lynne H Browne
Assistant Examiner—Aaron M Dunwoody

(57) ABSTRACT

The invention relates to a drive assembly for transmitting torque, having a propeller shaft (1) and an intermediate bearing (2), such as they are used in motor vehicles for example, wherein the propeller shaft (1) includes a first shaft portion (3) with a first joint (8), a second shaft portion (4) with a second joint (21), and a third joint (5) in the form of a constant velocity fixed joint which connects the first shaft portion (3) and the second shaft portion (4), and wherein the intermediate bearing (2), which adjoins the constant velocity fixed joint (5) and is associated with the first shaft portion (3), including rolling contact bearing (15); in the drive assembly, the smallest inner diameters (dcA, dwz) of the outer joint part (25) of the joint (5) and of the second shaft tube (19) associated with the second shaft portion (4) are greater than the greatest outer diameters (Dw, DL) of the first shaft portion (3) and of the rolling contact bearing (15) of the intermediate bearing (2); this assembly permits the two shaft portions (3, 4) to move inside one another in a telescopic and substantially force-free way if the axially permitted maximum plunging path of the first joint (8) and the second joint (21) is exceeded, for example as the result of a frontal impact of the vehicle.

12 Claims, 2 Drawing Sheets

DRIVE ASSEMBLY HAVING A PROPELLER AND AN INTERMEDIATE BEARING

BACKGROUND OF THE INVENTION

The invention relates to a drive assembly for transmitting torque, having a propeller shaft and an intermediate bearing, with the propeller shaft comprising a first shaft portion, a second shaft portion and a joint which connects the first shaft portion and the second shaft portion.

When designing propeller shafts for motor vehicles, it is not only necessary to take into account the requirements of standard operational conditions, but also the behavior of the propeller shaft in the case of a vehicle crash, especially in the case of a frontal collision. In such cases it is of paramount importance that axial shortening of the propeller shaft is possible in order to prevent the shaft from bending and penetrating the passenger compartment.

From DE 43 44 177 C1 there is known a drive assembly having a propeller shaft and an intermediate bearing, wherein the propeller shaft comprises shaft portions which are connected by a universal ball joint which is designed so as to accommodate plunging movements. In the case of a crash, the universal ball joint is destroyed and the journal of the one shaft portion is pushed through the outer joint part into the adjoining tube. The plug-in journal and/or the tube connected to the outer joint part and/or an additional component adapted to the diameter of the plug-in shaft, while being plastically deformed, are/is intended to accommodate energy. However, this design permits propeller shaft shortening to a limited extent only. If the maximum plunge possible in the axial direction is exceeded, there is a risk of the drive unit buckling and bending in an uncontrolled way.

In DE 38 22 644 A1, there is proposed a drive assembly wherein the propeller shaft is arranged inside a two-part tube assembly with a bending joint, which two-part tube assembly axially firmly connects the drive unit and the axle drive. The intention is that, in the case of a vehicle accident, the two tube portions of the tube assembly slide into one another while accommodating deformation energy.

It is therefore an object of the present invention to provide a drive assembly of the initially mentioned type which, if a maximum axial force is exceeded, permits the one shaft portion to enter the other shaft portion in a force-free way, with uncontrolled buckling and bending of the divided shaft in the region of the joint connecting the two shaft portions being avoided.

SUMMARY OF THE INVENTION

In accordance with one embodiment of the invention, the foregoing and other objects are achieved by providing a drive assembly wherein the propeller shaft comprises a first shaft portion comprising a first joint at one end, a second shaft portion comprising a second shaft tube and a second joint at one end, as well as a third joint which connects the first shaft portion and the second shaft portion, which is provided in the form of a constant velocity fixed joint. The third joint comprises an outer joint part which is open at both ends and which is connected to the second shaft tube, an inner joint part which is connected to a journal associated with the first shaft portion, and a cage, and balls which are held by the cage and are guided in running grooves of the outer joint part and of the inner joint part. The intermediate bearing, which adjoins the third joint and is associated with the first shaft portion, comprises at least one rolling contact bearing with an outer diameter and with a damping element. Furthermore, a smallest inner diameter of the outer joint part and a smallest inner diameter of the second shaft tube are greater than an outer diameter of the unit consisting of the inner joint part and the cage and also greater than a greatest outer diameter of the first shaft portion and also greater than an outer diameter of the rolling contact bearing. Furthermore, the cage of the third joint is designed as a nominal fracture region.

In the case of the solution in accordance with the invention, accident-related shortening of the shaft is achieved in that the first shaft portion of the propeller shaft, while being guided by the outer part of the broken third joint, is pushed telescopically into the second shaft tube of the second shaft portion in a force-free way. Because the second shaft journal of the first shaft portion is pushed into the second shaft tube of the second shaft portion, the joint function is eliminated and the shaft can no longer bend and buckle. The first shaft portion is guided in the second shaft portion.

According to a further embodiment, the first shaft portion comprises a first shaft tube whose ends are shaped so as to be journal-like, with the first shaft journal being connected to the first joint and with the second shaft journal comprising at least one shaft shoulder, a first bearing seat supporting the rolling contact bearing, as well as a joint seat which is connected to the inner part of the third joint provided in the form of a constant velocity fixed joint.

The rolling contact bearing, on the one hand, is held on the bearing seat of the first shaft portion between the shaft shoulder and the supporting ring and, on the other hand, it is connected to the damping member.

According to a further embodiment, the second shaft portion is provided with a journal which is connected to the second joint, and with a tube whose one end is firmly connected to the journal and whose other end comprises an outwardly pointing flange-shaped collar which is firmly connected to the outer joint part of the third joint.

Furthermore, the supporting ring axially holding the rolling contact bearing on the second shaft journal of the first shaft portion comprises an outer face which starts from the outer diameter of the rolling contact bearing and is tapered conically towards the constant velocity fixed joint. The conical outer face ensures that, during the sliding-in process, the first shaft portion is safely guided into the outer part of the third joint.

In yet a further embodiment, the intermediate bearing comprises a damping member which, on its outside, is connected to a receiving member and which, on its inside, is connected to the outer face of the rolling contact bearing, with the connection between the damping member and the rolling contact bearing being designed as a nominal fracture region or a separating region. In the case of a crash, the connection between the damping member and the rolling contact bearing tears or is released.

According to an alternative embodiment, the intermediate bearing comprises a bearing receiving sleeve which, on the one hand, is firmly connected to the damping member and which, on the other hand, receives the rolling contact bearing. In the case of an accident, the rolling contact bearing can be pushed out of the bearing receiving sleeve, or a connecting region between the bearing receiving sleeve and the damping member tears.

Furthermore, the second shaft portion is provided with a cover which is held between the outer joint part of the third joint and the outwardly pointing flange-shaped collar. Said cover seals the constant velocity fixed joint at the tube end and thus prevents lubricant from escaping.

According to a further embodiment, there is provided a rolling boot assembly which is connected to the outer joint part of the third joint on the one hand and to the second shaft journal of the first shaft portion on the other hand. Said rolling boot assembly seals the third joint at the journal end.

In a further embodiment, the first and/or the second joint can be provided in the form of constant velocity plunging joints which are/is connected to the main drive or rear axle drive of a motor vehicle. The constant velocity plunging joints are able to compensate for axial plunging movements resulting from vibrations for example.

BRIEF DESCRIPTION OF THE DRAWINGS

A preferred embodiment of the invention will be described below with reference to the drawings wherein.

DETAILED DESCRIPTION OF THE INVENTION

Figure 1:
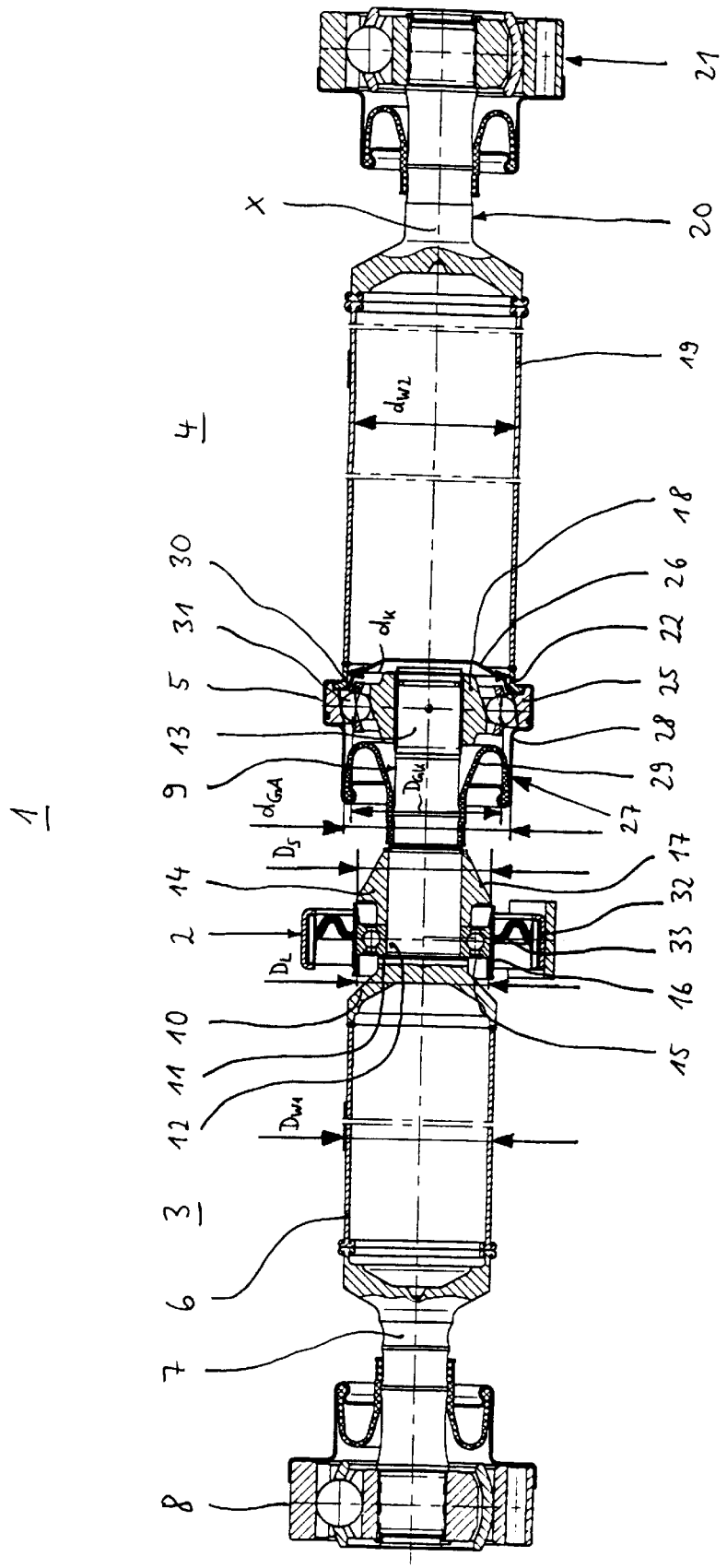
FIG. 1 is a longitudinal section through an inventive drive assembly having a propeller shaft and an intermediate bearing, in the aligned position.

FIG. 1 shows the drive assembly with the propeller shaft 1 and the intermediate bearing 2 as used in motor vehicles for example, in the aligned position with reference to the longitudinal axis X. The propeller shaft 1 comprises a first shaft portion 3 and a second shaft portion 4 which are connected to one another by a third joint provided in the form of a constant velocity fixed joint 5. The first shaft portion 3 consists of a first shaft tube 6 whose end facing away from the constant velocity fixed joint 5 is firmly connected to a first shaft journal 7 to which there is secured a first joint 8 which is connected to the main drive of a vehicle. The first joint 8 in the form of a constant velocity plunging joint permits axial plunging distances to be compensated for to a limited extent and allows angular movements. The other end of the first shaft tube 6 is firmly connected to a second shaft journal 9 which, towards the third joint in the form of a constant velocity fixed joint 5, is initially designed so as to be tapered with a cone 10 and which comprises a shaft shoulder 11 as well as a bearing seat 12 and a connecting portion 13. In a region between the shaft shoulder 11 and a supporting ring 14, the bearing seat 12 is received in a rolling contact bearing 15 which, in turn, is received in a bearing receiving sleeve 16. The first shaft tube 6, the bearing seat 12 and the rolling contact bearing 15 are designed in such a way that the outer diameter $D_L$ of the rolling contact bearing 15 is smaller than the greatest outer diameter $D_{W1}$ of the first shaft portion 6. Furthermore, the outer face 17 of the supporting ring 14 is designed to be conically tapered towards the constant velocity fixed joint 5, with the greatest outer diameter $D_S$ of the supporting ring 14, at most, corresponding to the outer diameter $D_L$ of the rolling contact bearing 15. The connecting portion 13 of the first shaft portion 3 is firmly connected to the inner joint part 18 of the constant velocity fixed joint 5 by toothing.

The second shaft portion 4 consists of a second shaft tube 19 whose end facing away from the constant velocity fixed joint 5 is firmly connected to a journal 20 to which, in turn, there is attached a second joint in the form of a constant velocity plunging joint 21. The latter is connected to the input of a rear axle drive of a motor vehicle. The other end of the second shaft tube 19 is connected to a tubular end of an outwardly flange-shaped collar 22. The inner diameter $d_{W2}$ of the second shaft tube 19 and the inner diameter $d_K$ of the collar 22 are identical. The flange portion of the collar 22, in turn, is connected to the outer joint part 25 of the constant velocity fixed joint 5. Between the collar 22 and the outer joint part 25 of the constant velocity fixed joint 5 there is provided a cover 26 which seals the constant velocity fixed joint 5 at the tube end and thus prevents any lubricant from escaping. Furthermore, a rolling boot assembly 27 seals the constant velocity fixed joint 5 at the journal end, said rolling boot assembly 27 consisting of an attaching cap 28 connected to the outer joint part 25 and of a rolling boot 29 connected to the shaft journal 9 of the first shaft portion 3 and to the attaching cap 28.

In addition to comprising the outer joint part 25 and the inner joint part 18, the constant velocity fixed joint comprises a cage 30 and balls 31 which are held by the cage 30 and engage running grooves of the outer joint part 25 and of the inner joint part 18.

The intermediate bearing 2 provided in the form of a resilient shaft bearing comprises a receiving member 32 to be connected to the vehicle body, and a damping member 33 as well as the bearing receiving sleeve 16 which is firmly connected to the damping member 33 on the one hand and to the outer ring of the rolling contact bearing 15 on the other hand.

The dimensions of the above-described components are calculated in such a way that the smallest inner diameter $d_{GA}$ of the outer joint part 25 and the smallest inner diameter $d_{W2}$ of the second shaft tube 19 are greater than the outer diameter $D_{GK}$ of the unit consisting of the inner joint part 18 and the cage 30, and in addition, said inner diameters are greater than the outer diameter $D_{W1}$ of the first shaft portion 3 and also greater than the greatest outer diameter $D_L$ of the rolling contact bearing 15.

Figure 2:
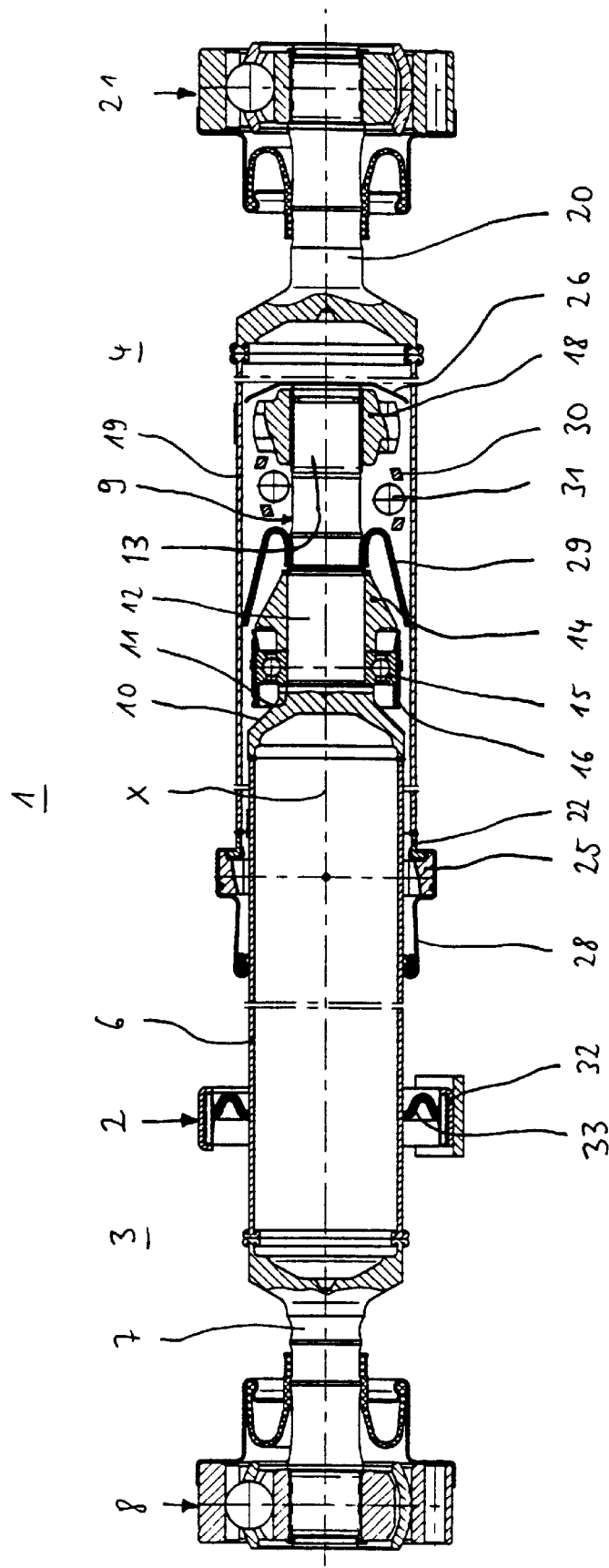
FIG. 2 is a longitudinal section through the inventive drive assembly according to FIG. 1, in a shortened condition.

FIG. 2 shows the same drive unit as FIG. 1 after the greatest possible axial plunge between the first joint and the second joint (8, 21) has been exceeded as a result of, for example, an accident.

As shown in FIG. 2, the first shaft portion 3 has moved telescopically in a force-free way into the second shaft portion 4 after the cage 30 of the constant velocity fixed joint 5 fractured. During the moving-in process, the bearing receiving sleeve 16 was separated from the damping member 33 and the rolling boot 29 was torn off at the connection with the attaching cap 28, in the process of which the attaching cap 28 was radially widened. The balls 31 of the constant velocity fixed joint 5 moved out of the running grooves of the inner joint part 18 and of the outer joint part 25 and, together with the fractured cage 30, were pushed into the second shaft tube 19. During the moving-in process, the second shaft journal 9 of the first shaft portion 3 was guided in a centered way on the axis X of the second shaft portion 4 by the inner joint part 18 of the fractured constant velocity fixed joint 5 and by the conically shaped supporting ring 14.

From the foregoing, it can be seen that there has been brought to the art a new and improved drive assembly. While the invention has been described in connection with one or more embodiments, it should be understood that the invention is not limited to those embodiments. On the contrary, the invention covers all alternatives, modifications and equivalents as may be included in the spirit and scope of the appended claims.

What is claimed is:

1. A drive assembly for transmitting torque, having a propeller shaft (1) and an intermediate bearing (2), with the propeller shaft (1) having a first shaft portion (3) comprising a first joint (8) at one end, a second shaft portion (4) comprising a second shaft tube (19) and a second joint (21) at one end, as well as a third joint (5) which connects the first shaft portion (3) and the second shaft portion (4), said third joint (5) being a constant velocity fixed joint which comprises an outer joint part (25) which is open at both ends and which is connected to the second shaft tube (19), an inner joint part (18) which is connected to a journal (9) associated with the first shaft portion (3), and a cage (30) and balls (31) which are held by the cage (30) and are guided in running grooves of the outer joint part (25) and of the inner joint part (18), wherein the intermediate bearing (2), which adjoins the third joint (5) and is associated with the first shaft portion (3), comprises at least one rolling contact bearing (15) with an outer diameter ($D_L$) and a damping member (33), and wherein, furthermore, a smallest inner diameter ($d_{GA}$) of the outer joint part (25) and a smallest inner diameter ($d_{w2}$) of the second shaft tube (19) are greater than an outer diameter ($D_{cx}$) of the unit consisting of the inner joint part (18) and the cage (30) and also greater than a greatest outer diameter ($D_{wn}$) of the first shaft portion (3) and also greater than an outer diameter ($D_L$) of the rolling contact bearing (15), such that said first shaft portion (3), inner joint part (18), cage (30) and balls (31) are telescopically collapsible into said second shaft tube (19).

2. A drive assembly according to claim 1, wherein the first shaft portion (3) comprises a first shaft tube (6) which carries a first and second shaft journal (7, 9) at its ends, wherein the first shaft journal (7) is connected to the first joint (8) and wherein the second shaft journal (9) comprises at least one shaft shoulder (11), a bearing seat (12) accommodating the rolling contact bearing (15), and a connecting portion (13) which is connected to the inner part (18) of the third joint (5) provided in the form of a constant velocity fixed joint.

3. A drive assembly according to claim 2, wherein the rolling contact bearing (15) is held on the bearing seat (12) of the first shaft portion (3) between a shaft shoulder (11) and a supporting ring (14) which is firmly connected to the second shaft journal (9), and the rolling contact bearing (15) is connected to the damping member (33).

4. A drive assembly according to claim 1, wherein the second shaft portion (4) comprises a journal (20) which is firmly connected to the second joint (21) and which is firmly connected to the second shaft tube (19), with an end of the second shaft tube (19) arranged opposite the journal comprising an outwardly pointing flange-shaped collar (22) which is firmly connected to the outer joint part (25) of the third joint (5).

5. A drive assembly according to claim 3, wherein the supporting ring (14) which axially holds the rolling contact bearing (15) on the second shaft journal (9) of the first shaft portion (3) comprises an outer face (17) which starts from the outer diameter ($D_L$) of the rolling contact bearing (15) and is conically tapered towards the third joint (5).

6. A drive assembly according to claim 1, wherein a damping member (33), on its outside, is connected to a receiving member (32) and, on its inside, is connected to the outer face of the rolling contact bearing (15), with the connection between the damping member (33) and the rolling contact bearing (15) being designed as a nominal fracture region or a separating region.

7. A drive assembly according to claim 1, wherein the intermediate bearing (2) is provided with a bearing receiving sleeve (16) which is firmly connected to the damping member (33) and receives the rolling contact bearing (15).

8. A drive assembly according to claim 4, wherein the second shaft portion (4) comprises a cover (26) which is held between the outer joint part (25) of the third joint (5) and the outwardly pointing flange-shaped collar (22).

9. A drive assembly according to claim 1, wherein there is provided a rolling boot assembly (27) which is connected to the outer joint part (25) of the third joint (5) and to the second shaft journal (9) of the first shaft portion (3).

10. A drive assembly according to claim 1, wherein the first joint (8) is provided in the form of a constant velocity plunging joint.

11. A drive assembly according to claim 1, wherein the second joint (21) is provided in the form of a constant velocity plunging joint.

12. A drive assembly according to claim 10, wherein the second joint (21) is provided in the form of a constant velocity plunging joint.

* * * * *

UNITED STATES PATENT AND TRADEMARK OFFICE
CERTIFICATE OF CORRECTION

PATENT NO. : 6,379,255 B1
DATED : April 30, 2002
INVENTOR(S) : Herbert Cermak and Dietmar Lück It is certified that error appears in the above-identified patent and that said Letters Patent is hereby corrected as shown below:

Column 5,
Line 21, "$D_{CX}$" should be replaced by -- $D_{GK}$ --.
Line 23, "$D_{WN}$" should be replaced by -- $D_{W1}$ --.

Signed and Sealed this

Eighth Day of October, 2002

Attest:

Attesting Officer

JAMES E. ROGAN
*Director of the United States Patent and Trademark Office*